Nov. 28, 1961 — W. DE HAAN — 3,010,757

VEHICLE CAB MOUNTING

Filed Aug. 3, 1959

INVENTOR.
Wolbert DeHaan
BY
D. D. McGraw
ATTORNEY

United States Patent Office 3,010,757
Patented Nov. 28, 1961

3,010,757
VEHICLE CAB MOUNTING
Wolbert De Haan, Farmington, Mich., assignor to General Motors Corporation, Detroit, Mich., a corporation of Delaware
Filed Aug. 3, 1959, Ser. No. 831,231
5 Claims. (Cl. 296—35)

The invention relates to the mounting of a passenger compartment or cab on a vehicle frame and more particularly to the mounting of such cabs in order to minimize the effects of frame flexure thereon. The effects of frame flexure are commonly known as frame beaming or cab hop and result from the flexing of the chassis at its natural frequency. Frame beaming is generally pronounced at different specific road speeds and is partially dependent upon tire rate, suspension spring rate, stiffness of the chassis frame, wheel base, the chassis loads, and their distribution on the chassis. These factors each contribute to the excitation of the natural frequencies of the system body.

In order to reduce frame beaming two basic considerations must be made. The stiffness of the vehicle's frame should not be any higher than necessary to carry the vehicle's components and the design payload with a durable chassis performance. In addition, cab response to chassis deflections incurred in the operation of the vehicle should be isolated as much as possible. Since the cab and sheet metal unit is attached at various mounting points to the frame, this consideration has resulted in numerous proposals to obtain the desired performance characteristics.

It is now proposed to provide a cantilever or tension bar mounting system which will substantially isolate the flexing of the frame from the cab. This results in a mounting system which reduces the kinetic energy between the chassis and the cab and sheet metal unit to a minimum, thus establishing the potential energy as a constant relative to the chassis and the cab and sheet metal unit.

In many vehicles the previously proposed systems cannot accomplish an effective job in balancing the inertia forces because the forward node point of the chassis is positioned near the front of the vehicle dash. This position of the forward node point allows the chassis to impress forces on the cab and sheet metal unit at both ends and in opposite rotational directions about this node point. Thus the cab and sheet metal units are highly stressed at their point of juncture and their reaction to the frame can cause an increase of the frame flexing and induce still higher levels of cab hop or frame beaming.

Figure 4:
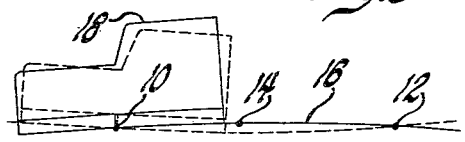
FIGURE 4 is a schematic view of a vehicle subject to frame beaming in which the cab is tightly secured to the frame at several points in accordance with common practice.
Figure 5:
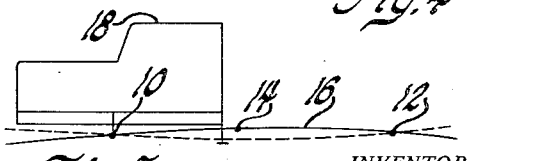
FIGURE 5 is a schematic view of a vehicle embodying the invention and illustrating the effects of frame beaming on the cab.

The forward and rear node points 10 and 12 are the points on the frame 16 having the least vertical and longitudinal displacement during frame flexure. However, they are also the points of maximum angular or rotational displacement as may be seen in FIGURES 4 and 5. The point of least rotational displacement is at the point 14 of maximum frame deflection. In many vehicles the node point 10 is at the forward end of the cab in the general vicinity of the dash and the point 14 is in the general vicinity of the rear end of the cab. This is especially true of relatively light trucks. Since the minimum angular displacement of the vehicle frame 16 occurs at point 14, the rotational control of the cab mounting system should be in the vicinity of this point. The invention embodies structure which provides vertical and longitudinal control by mounting the cab 18 in the vicinity of point 10 and rotational control by mounting the cab adjacent point 14.

Figure 1:
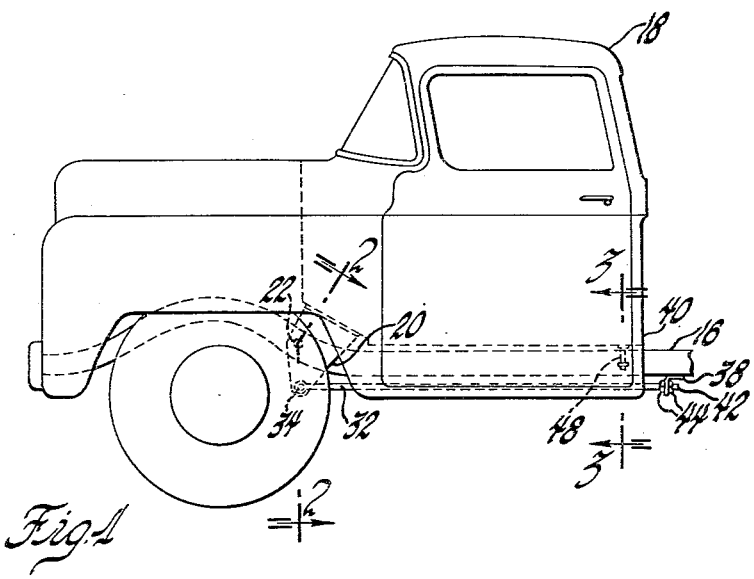
FIGURE 1 is a side view of a vehicle embodying the invention and having parts broken away and in phantom.
Figure 2:
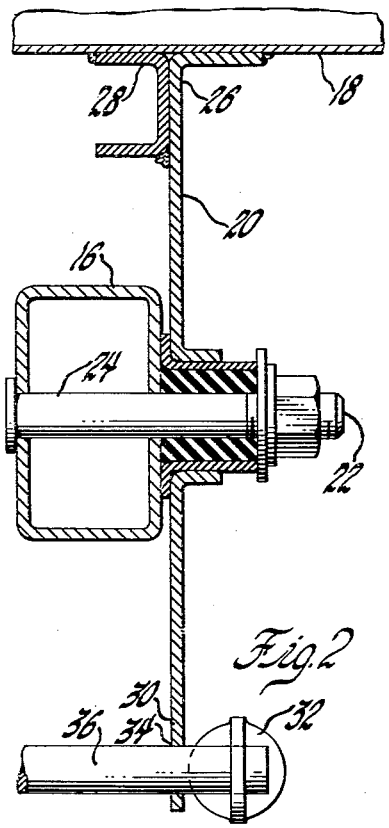
FIGURE 2 is a partial section view taken in the direction of arrows 2—2 of FIGURE 1.
Figure 3:
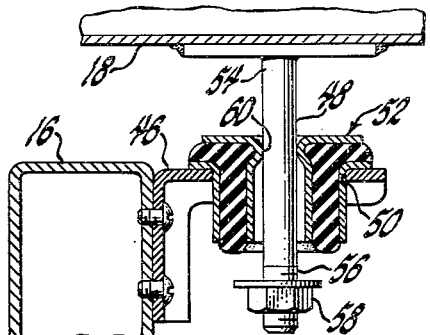
FIGURE 3 is a partial section view taken in the direction of arrows 3—3 of FIGURE 1.

As seen in FIGURE 1, the vehicle cab 18 is mounted on the frame 16 by means of a forward cantilever type supporting link system and a rearward lateral control system. The forward system includes one or more support links or levers 20 which are pivotally attached to frame 16 at 22. It has been quite satisfactory to use two support links 20, each of which is pivoted on the outer walls of the side rails forming frame 16. They may be pivoted about a common shaft or use separate pivot rods 24. The axis of pivot 22 is preferably located at the forward node point 10 or as close thereto as is permissible within design limits of the overall vehicle. The upper end 26 of each of the links 20 is secured to the cab 18 by any suitable means such as welding to the cab sheet metal and the cab channels 28. It is important to secure cab 18 to the links 20 so that the entire cab weight with the normal load imposed thereon may be supported by the links. The cab in effect becomes a cantilever which is pivoted at 22.

The lower end 30 of each link 20 has a tension bar 32 pivotally or rigidly attached thereto at 34. A pivot rod 36, which may or may not be common to both links 20, may be used for this purpose if desired, or any other suitable connection may be used. Tension bars 32 extend rearwardly and generally perpendicular to pivot axis 22. They may also be generally parallel to the vehicle frame 16. Brackets 38 are secured to frame 16 in the general area of the cab rear end 40. The threaded end 42 of each bar 32 may extend through each bracket 38. A pair of lock nuts 44, or any other suitable tension adjusting device may be positioned on each tension bar 32 so that the tension bars are longitudinally adjusted and positioned relative to frame 16 and locked in place.

The center of gravity of cab 18 is located rearwardly of the support links 20, thus tending to cause the support links to pivot clockwise about pivot points 22 as seen in FIGURE 1. The lever action of links 20 is counteracted by the axial loading of tension bars 32 to hold cab 18 in the desired position relative to frame 16. Tension bars 32 will thus act as tension springs having a very high spring rate.

The rear end 40 of the cab 18 is preferably located adjacent the point 14 on frame 16. The frame is provided with a bracket 46 extending inwardly from one frame longitudinal rail and beyond the frame centerline. Bracket 46 may be a frame cross member if desired. A bolt 48 is suitably secured to the rear end 40 of the cab as near as possible to the vehicle cab or body centerline and extends downwardly through an aperture 50 in chassis bracket 46. The main body of bolt 48 is preferably of constant cross section and sufficiently long to extend through and beyond the flexible guide bushing 52 which is secured in the aperture 50. With the cab in the normal rest position under normal load, bolt 48 has an upper portion 54 extending above bushing 52 and a lower portion 56 extending below the bushing. The end of the bolt lower portion 56 may be threaded and a control nut and washer assembly 58 secured thereto. This assembly is also spaced below the lower end of the bushing 52. The internal aperture 60 of bushing 52 preferably provides a slip fit with the bolt 48 so that the bolt is prevented from having any substantially lateral or longitudinal movement relative to the bushing but may move freely along its axis. The flexible portion of the bushing will provide a cushion effect so as to prevent shock overload on the bolt 48 during vehicle operation.

The provision of the rotatably mounted support links 20 provides a forward cab mount system at the forward node point 10 which gives full vertical and longitudinal control of the movement of cab 18 relative to the frame 16 but permits rotational displacement of the frame 16 relative to the cab 18 during frame flexing. Since the node point 10 is the point of maximum rotational displacement and minimum vertical displacement of the frame and frame beam, the cab 18 will tend to remain fixed with the frame rotating about it.

The single rear mount is positioned at or near the point 14 of maximum vertical frame deflection. This point is also the point of minimum rotational or angular displacement. The rear mounting system provides for annular and lateral control of the cab at this point by permitting vertical movement of the frame underneath the cab rear end while limiting lateral cab movement relative to the frame. Bolt 48 is preferably of such a length as to permit substantially full frame beaming vertical deflection without having the cab bottom against the guide bushing 52 during maximum upward flexure or having a nut and washer assembly 58 bottom against the lower end of bushing 52 during maximum downward frame flexure.

It may also be desirable to mount vehicle body components at the rear of a vehicle chassis and a similar arrangement may be used with the rear node point 12 providing the point for vertical and longitudinal control mounts.

What is claimed is:

1. In a motor vehicle comprised of a cab and a frame having frame beaming characteristics including a first point of minimum vertical displacement and maximum angular displacement and a second point of maximum vertical displacement and minimum angular displacement, first cab mounting means providing static cab support and securing said cab to said frame substantially at said first point for vertical and longitudinal control while permitting rotational displacement thereabout only in a substantially vertical plane, and second cab mounting means securing said cab to said frame substantially at said second point for horizontal rotational and lateral control while permitting vertical displacement thereabout, said first cab mounting means including means statically holding said cab at said second point vertically substantially free of said frame, said second cab mounting means providing only dynamic vertical cab displacement support.

2. The cab mounting means of claim 1, said first mounting means being a cantilever type cab supporting mount.

3. In combination in a motor vehicle, a vehicle frame having a frame beaming node and a point of maximum vertical deflection, passenger compartment mount and support means, a passenger compartment mounted and supported adjacent one end thereof on said frame by said mount and support means for rotation about a transverse axis passing substantially through said frame beaming node, compartment mounting means, said compartment being mounted by said compartment mounting means adjacent its other end in spaced relation to said frame and secured thereby only against lateral movement relative to said frame along a transverse axis passing substantially through said point of maximum vertical frame deflection.

4. In a vehicle having a frame and a cab mounted thereon, mounting means securing said cab to said frame and comprising, a first mount providing static cab support on said frame and attached adjacent one end of said cab and rotatably secured to said frame about a transverse axis and securing said cab against vertical movement relative to said frame, said first mounting including tensioned support means statically holding said cab in spaced relation to said frame, and a second mount attached adjacent the other end of said cab and securing said cab against lateral movement relative to said frame and permitting unrestricted vertical cab movement throughout a dynamic range of movement of said cab other end.

5. A vehicle having a cab and a frame and a mounting for supporting and retaining said cab on said frame, said mounting comprising a pair of transversely spaced cab support levers each secured at one end to the forward end of said cab and pivotally attached intermediate their ends to said frame, a pair of tension bars each pivotally attached to the other end of each of said levers and extending underneath said cab and adjustably secured to said frame adjacent the rear end of said cab, and lateral cab movement control mount means at the rear of said cab, said tension bars being adjusted to provide a cantilever mount for said cab through said support levers.

References Cited in the file of this patent

UNITED STATES PATENTS

| | | |
|---|---|---|
| 2,210,519 | Wollensak | Aug. 6, 1940 |
| 2,864,121 | Imber et al. | Dec. 16, 1958 |
| 2,885,243 | Feil | May 5, 1959 |